(12) United States Patent
Borg

(10) Patent No.: US 6,186,163 B1
(45) Date of Patent: Feb. 13, 2001

(54) DOUBLE SEAT VALVE

(75) Inventor: Søren Borg, Egtved (DK)

(73) Assignee: Alfa Laval LKM APS, Kolding (DK)

( * ) Notice: Under 35 U.S.C. 154(b), the term of this patent shall be extended for 0 days.

(21) Appl. No.: 09/554,375

(22) PCT Filed: Nov. 5, 1998

(86) PCT No.: PCT/EP98/07066

§ 371 Date: Jun. 26, 2000

§ 102(e) Date: Jun. 26, 2000

(87) PCT Pub. No.: WO99/26000

PCT Pub. Date: May 27, 1999

(30) Foreign Application Priority Data

Nov. 13, 1997 (DE) .............................................. 197 50 300

(51) Int. Cl.⁷ .......................... F16K 11/20; F16K 31/124
(52) U.S. Cl. .................. 137/312; 137/614.18; 251/63.5; 251/63.6
(58) Field of Search ............................ 137/312, 614.17, 137/614.18, 614.19; 251/63.5, 63.6

(56) References Cited

U.S. PATENT DOCUMENTS

| | | | |
|---|---|---|---|
| 4,605,035 | * 8/1986 | Rasmussen et al. | 137/614.18 X |
| 6,047,730 | * 4/2000 | Coura et al. | 137/614.18 |
| 6,089,255 | * 7/2000 | Bonnefous et al. | 137/614.18 X |

FOREIGN PATENT DOCUMENTS

| | | |
|---|---|---|
| 30 05 329 C2 | 8/1985 | (DE) . |
| 42 36 464 | 5/1994 | (DE) . |
| 0 174 384 | 3/1986 | (EP) . |
| 0 545 846 | 6/1993 | (EP) . |
| 0 819 876 | 1/1998 | (EP) . |

\* cited by examiner

Primary Examiner—Kevin Lee
(74) Attorney, Agent, or Firm—Michael J. Striker

(57) ABSTRACT

The invention is directed to a double seat valve with means for preventing leakage. A shared drive unit is provided for the actuation of the two valve disks (6, 7). This drive unit contains a cylinder (17) with a first work piston (18) which is loaded at both sides by pressure springs (29, 22) and is fixedly connected with the valve stem or valve shaft (13) of the lower valve disk (7), this valve disk (13) penetrating the upper valve disk (6) and its tubular shaft (14) in a telescoping manner, the shaft, in turn, projecting into the cylinder (17) by its upper end and having an abutment (28) at that location for the lower pressure spring (29) which presses the upper valve disk (6) into its seat (8), and a second work piston (36) which acts on the tubular shaft and is movable on the tubular shaft is arranged under the first work piston (18) in the cylinder (17), and a third work piston (30) which acts on the lower valve disk is arranged above the first work piston. The first spring (22) is arranged so as to be supported at the third piston (30) so that the drive consumes less air and the valve switches faster.

20 Claims, 2 Drawing Sheets

DOUBLE SEAT VALVE

BACKGROUND OF THE INVENTION

The invention is directed to a double seat valve with means for preventing leakage, particularly for the food and beverage industry, which has in its housing two valve disks (6, 7) that cooperate with one another and define a leakage space (10) which customarily opens out into the open via lines (11). A shared drive unit is provided for the actuation of the two valve disks (6, 7). This drive unit contains a cylinder (17) with a first work piston (18) which is loaded at both sides by pressure springs (29, 22) and is fixedly connected with the valve stem or valve shaft (13) of the lower valve disk (7), this valve disk (13) penetrating the upper valve disk (6) and its tubular shaft (14) in a telescoping manner, the shaft, in turn, projecting into the cylinder (17) by its upper end and having an abutment (31) at that location for the lower pressure spring (29) which presses the upper valve disk (6) into its seat (8), and a second work piston (36) which acts on the tubular shaft and is movable on the tubular shaft is arranged under the first work piston (18) in the cylinder (17), and a third work piston (30) which acts on the lower valve disk is arranged above the first work piston.

A blocking valve of the type described above is known from DE-A1 30 05 329.

The seat faces of the two valve disks are constructed so as to be conical and are aligned in such a way that the two valve disks move into the seat face in the same direction. A leakage space which customarily discharges into the open via a line is formed between the valve disks.

Further, DE 42 36 464 A1 discloses a double seat valve in which the lower valve disk continues downward into a balance piston which has approximately the same diameter as the lower valve disk in order to prevent the lower valve disk from lifting due to pressure shocks and to prevent medium from entering the leakage space. Pressure shocks in the pipeline accordingly act on the balance cylinder and valve disk with the same force, so that the pressure forces are balanced in the axial direction.

The known valves can carry out three functions. To open the valve, both valve disks are lifted; to clean the valve seats, the lower or upper valve disk can each be individually moved out of its seat face slightly in order to clean the seat face.

For this purpose, drive units are provided for the valves, these drive units having cylinders which are arranged in series and in which the required pistons are arranged. The pistons act on the two valve disks via two concentric valve shafts.

For opening, a first work piston which is connected with the lower valve disk via a valve shaft is acted upon by compressed air. Accordingly, the first piston is moved upward against the force of a first spring while carrying along the lower valve disk, this spring being further pretensioned until the lower valve disk abuts against the upper valve disk. The leakage space is then closed. When lifted further, the two valve disks move jointly upward, so that the valve is opened.

In the opened state, a second spring which is supported against stops at the valve shaft and at the tubular valve shaft press the two valve disks together.

The closing of the valve proceeds in the reverse order; but the first work piston is moved by the force of the first spring in the pressureless state. As soon as the upper valve disk has reached its seat, the two valve disks separate and the lower valve disk moves into its seat. In so doing, the second spring is further compressed.

To clean the valve seats, the valve disks must be lifted individually. A second and a third piston are provided for this purpose. These pistons act individually, via the valve shafts, on the lower and upper valve disks, respectively.

The second piston for the cleaning lift of the lower valve disk is located in its own cylinder above the cylinder for the first piston. The valve shaft for the lower valve disk is guided in this second cylinder. As soon as its underside is acted upon by compressed air, it lifts the associated valve shaft via a suitable stop and, along with the valve shaft, lifts the lower valve disk out of its seat. A suitable cleaning medium can penetrate into the leakage chamber through an annular gap formed in this way between the valve disk and valve seat.

To clean the upper valve seat, the third piston which is arranged in the cylinder between the first piston and the lower housing wall, is acted upon from below by compressed air. The piston is lifted until it abuts against an abutment arranged at the tubular valve shaft. The upper valve disk is accordingly also lifted from its seat somewhat via the valve shaft. The associated valve seat is rinsed by the penetrating cleaning medium.

The construction of the drive unit turns out to be quite costly due to the large number of switching functions.

SUMMARY OF THE INVENTION

It is the object of the invention to provide a double seat valve of the type mentioned above with a drive unit which is beneficial with respect to manufacturing technique and which consumes a small amount of air when switching, responds quickly to switching command, and safely prevents mixing of media in all conceivable operating states.

This object is met in that the first spring is arranged so as to be supported at the third piston. In this way, a special cylinder for the piston for lifting the lower valve disk can be dispensed with for cleaning the lower valve seat. Instead, the piston is arranged in the same cylinder as the rest of the pistons. The drive unit for the valve is therefore favorably designed with respect to manufacturing technique. In contrast to the drive units formerly used for double seat valves, the double seat valve according to the invention needs no additional cylinders in order to reliably carry out all desired functions, namely, opening, closing and cleaning the valve seats. At the same time, the overall height of the cylinders is advantageously reduced.

Air consumption during the cleaning lift of the lower valve disk is reduced advantageously when a stop limiting the lift of the third piston is provided in the cylinder.

A spring cage can be dispensed with in an advantageous manner in that the first spring has a length defined by stops.

The position of the second radially sealing valve disk in the cylindrical seat face is secured in that the first spring is arranged so as to hold the valve disks at a distance under pretensioning.

Settling phenomena in the upper seal can be advantageously compensated because the spacing of the valve disks is adjustable.

When an intermediate space is provided between the drive unit and valve housing, in which intermediate space a preferably adjustable stop is arranged on the tubular valve rod for limiting the path of the upper valve disk, the amount of lift can be conveniently adjusted from the outside.

The construction of the drive unit, according to the invention, can be used particularly advantageously in a valve in which the lower valve disk is provided with a radially acting seal which cooperates with a cylindrical seat face of the valve housing.

An advantageously precise centering of the valve disks in the sealing seat results in combination with an upper valve disk which is constructed so as to cooperate with a conical seat face of the valve housing.

In an alternative construction, the upper valve disk can also be constructed so as to cooperate with an axial seat face of the valve housing.

When the upper valve disk has a cylindrical recess for tightly receiving the lower valve disk, the valve advantageously switches without leakage.

The seals are treated gently during switching in that the upper valve disk has a surface which is arranged so as to form a throttle gap with a counter-face of the valve housing along a partial lift path.

Pressure shocks do not result in leakage because the lower valve disk has a hydraulic compensating surface. This compensating surface is realized by a balance piston which is guided in the housing and connected with the lower valve disk.

When a leakage line guided through the valve housing is provided concentric to the tubular shaft, the cross section of the line can be expanded approximately to that of the valve passage.

The installation position of the valve can be freely selected when the concentric leakage line opens into a stationary housing.

The magnitude of the cleaning lift for the upper valve disk is limited because there is provided at the cylinder above the second work piston a stop which limits its lift.

Due to the fact that a spacer defining the minimum length of the second spring is provided between the first and second work piston, the maximum distance between the valve disks remains limited, in particular, the spacing of the valve disks during the cleaning lift is limited to a safe amount.

When a preferably adjustable stop for the upper, third piston is provided on the valve shaft of the bottom valve disk, the distance between the valve disks in the rest position can be selected in a corresponding manner.

The end position is fixed in the open state in that a stop is provided for the valve shaft, which stop limits the upward path of the valve shaft.

A stop is provided on the tubular valve rod in an advantageous manner for carrying along by the second piston, the second work piston striking against this stop at the top so that the upper valve seat can also be cleaned.

When at least one of the valve disks has a throttle edge which preferably projects into a through-opening of the valve seat, a steep rise in pressure in the leakage chamber during the opening movement of the valve disks is advantageously prevented. The seals at the valve disks are also loaded to a lesser degree by the lower inlet velocity of the medium flowing into the leakage chamber.

The valve disks move into the valve seats in a reliable manner when the valve disk is constructed preferably so as to be conical and the throttle edge is constructed as an end edge of a cylindrical surface formed integral therewith, the height of the latter preferably exceeding the amount of cleaning lift. Due to the cylindrical throttle edges, the valve disk is initially guided when moving into the valve seat, and the valve disks are centered automatically when moving in due to the conical shape of the valve disks. Accordingly, jamming of the valve disks and valve seats is virtually ruled out. To clean the sealing face, the valve disk can be lifted by a small amount. The throttle gap formed in this way remains constant over the path of this cleaning lift, since the height of the integral cylindrical surface exceeds the amount of cleaning lift.

A pressure rise in the leakage space during the cleaning of the valve seats is prevented in that a throttle gap formed by the throttle edge and through-opening has a smaller throughsurface than the total surface area of the lines which customarily open out from the leakage space into the open.

The invention will be described in a preferred embodiment form with reference to a drawing, wherein further advantageous details are shown in the Figures. Parts which are identical to one another in terms of function are provided with the same reference numbers.

Due to the fact that the first and third pistons are arranged so as to form a work space with a compressed air connection and the first piston is arranged so as to act on the upper valve disk, additional pressure can be exerted on the upper valve disk during the cleaning lift of the lower valve disk. This provides added protection against opening.

DETAILED DESCRIPTION OF THE PREFERRED EMBODIMENTS

Figure 1:
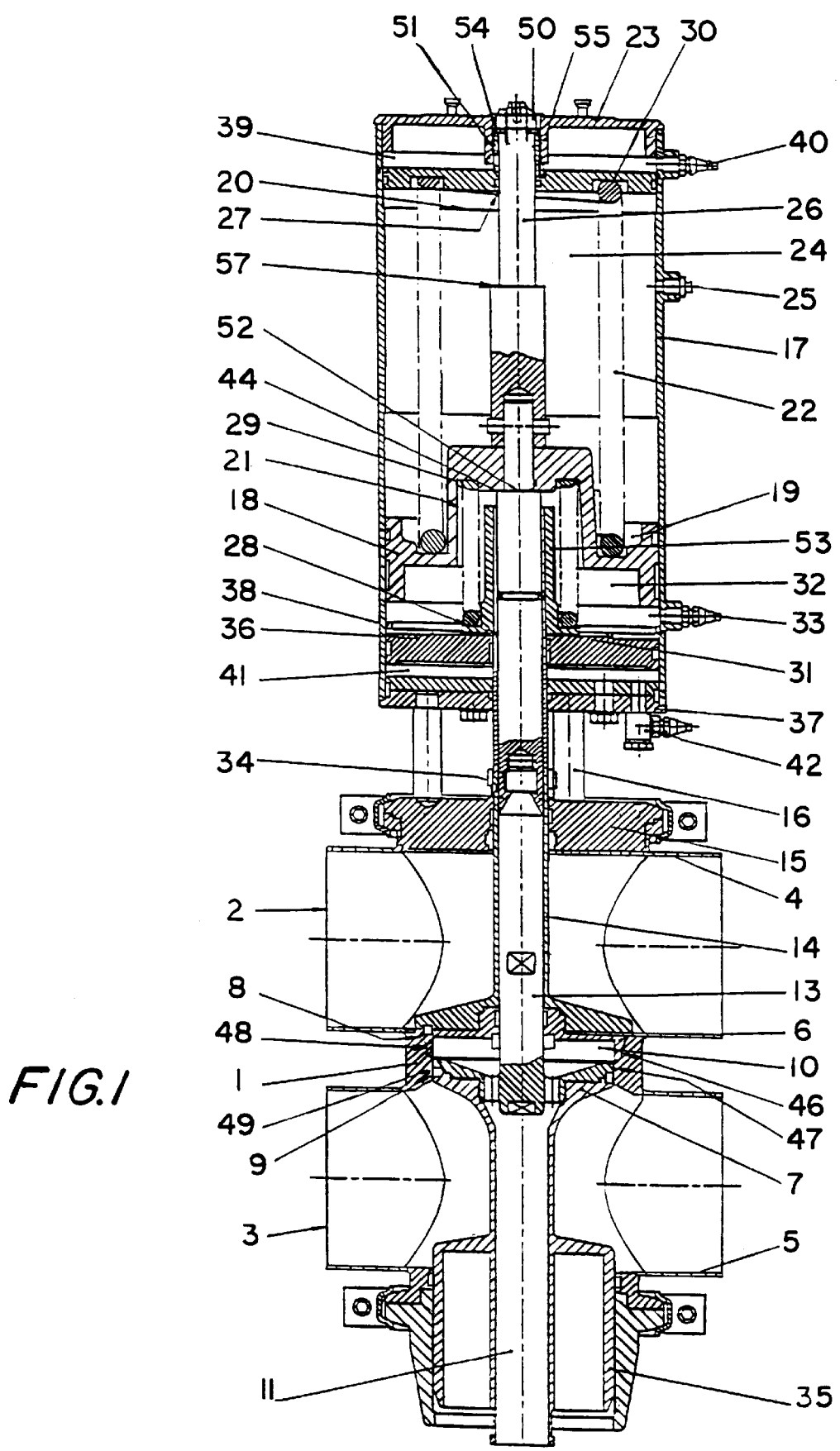
FIG. 1 is a schematic view of a vertical section through the double seat valve according to the invention in the rest position.

According to FIG. 1, the double seat valve is formed of an annular line-connecting housing part 1 with valve seats 8 and 9. The liquid-tight closure between an upper housing part 4 with line connections 2 and the lower housing part 5 with line connections 3 is effected by an upper valve disk 6 and a lower valve disk 7. In the closing position, these valve disks are seated in the upper valve seat 8 and lower valve seat 9, respectively. A leakage space 10 is formed between the two valve disks 6, 7 in the closed position shown. Bore holes opening into a line 11 are provided in the lower valve disk 7 and lead to a leakage outlet. If liquid should penetrate into the leakage space 10 under exceptional circumstances or during cleaning via valve seat 8 or 9, this liquid is guided into the open through line 11.

A mixing of liquids located in the upper valve housing 4 and in the lower valve housing 5 is therefore reliably prevented.

The lower valve disk 7 is fixedly connected with a valve shaft 13, while the upper valve disk 6 is fixedly connected with a tubular valve shaft 14 which is supported in turn on the valve shaft 13 so as to be displaceable axially in a telescoping manner. A cylinder 17 is connected via spacer elements 16 to an upper valve cover 15 which closes the upper housing part 4.

A first work piston 18 is fixedly arranged at the axially movable valve shaft 13. It terminates tightly with the inner housing wall of the cylinder 17 by its outer circumferential surface.

The piston 18 has an annularly extending depression 19. A first pretensioned pressure spring 22 is supported in the depression 19, this pressure spring 22 being supported by its opposite end at a third piston 30 for the cleaning lift of the lower valve disk 7, which third piston 30 is arranged in the cylinder 17.

The first pressure spring 22 is fitted between the first work piston 18 and the third work piston 30. The forces resulting from the pretensioning are received by the lengthened valve shaft 13. The third work piston 30 forms an abutment which is supported via a sleeve 51 at the nut 50 which is screwed to the upper end of the valve rod 13. The first work piston 18 forms the abutment on the other side. More particularly, the first work piston is supported on the collar 52 of the valve shaft 13 for the lower valve disk. The pretensioning force of the first spring 22 are therefore received as tensile forces by the valve shaft portion between the nut 50 and the collar 52.

On the opposite side of the depression 19, the first work piston 18 has a pot-shaped portion 21 in which a second spring 29 is received. This pretensioned second pressure spring 29 is supported by the upper end in the region of the portion 21 at the first work piston 18 and by the other end at a shoulder 28 of a spacer sleeve 53 which is supported in turn on a spring ring 31 fastened to the tubular valve shaft 14. The force of the spring 29 presses the upper valve disk 6 onto its valve seat 8 via the shoulder 28 and the spring ring 31 fastened to the tubular valve shaft 14.

At the same time, the second spring 29 presses the third work piston 30 and, with it, the valve shaft 13 upward until the wok piston 30 abuts in its upper end position. This upper end position is determined by the shoulder 54 which is formed integral with the sleeve 51 and which rests against the end face of a bushing-like protuberance 55 of the upper cylinder cover 23. The end position is adjustable by means of the upper nut 50. The lower valve disk 7 is therefore held fixedly in an axial position corresponding to the valve seat 9. Therefore, in the closed position, the lower and upper valve disk maintain a constant distance with respect to one another which is adjustable by a nut 50.

In this way, the valve is closed in a pressureless manner.

The pressure space 24 formed by the cylinder 17, an upper, third piston 30 and the first work piston 18 can be acted upon by compressed air via connection 25. The first work piston 18 can be pretensioned in this way in addition to the spring force of the pressure springs 22.

Above the first work piston 18, the valve shaft 13 is divided and, in the form of lengthening 26, is guided through an opening 27 of the upper cylinder cover 23. The instantaneous switching state of the valve can immediately be recognized from the outside in this way and the position of the lower valve disk can be adjusted externally.

Below the first work piston 18, a second work piston 36 is arranged in the cylinder 17. The second work piston 36 is supported so as to be movable on the tubular shaft 14. In the rest position shown in the Figure, it lies below the spring ring 31 which is fastened to the tubular valve shaft 14 and which serves as an abutment.

The first and second work pistons 18, 36 form a second work space 32 to which compressed air can be admitted via connection 33. Its lift is limited by the lower cylinder cover 37 and a stop 38 arranged in the cylinder housing wall.

A third pressure space 39 to which compressed air can be admitted via connection 40 is formed between the third work piston 30 and the upper cylinder cover 23.

A fourth pressure space 41 to which compressed air can be admitted via connection 42 is located between the lower cylinder cover 37 and the second work piston 36.

The valve is opened in that compressed air is switched to connection 33. Due to the increased pressure in the second pressure space 32, the first work piston 18 is first moved upward with the shaft 13 and with the lower valve disk 7 fastened thereto until it has moved into the cylindrical recess of the upper valve disk 6 and comes into contact with the latter and carries it along with it, so that the valve opens. The second work piston 36 contacts the lower cylinder cover 37. The second pressure spring 29 holds the two valve disks in sealing contact by its pretensioning force. The leakage space 10 is then closed. During the lift, the first spring 22 is further compressed until the stop 34 on the outer valve shaft 14 abuts against the lower cylinder cover 37 and accordingly limits the lift of the valve toward the top. In an alternative construction, stop 57 can also limit the lift when designed in a corresponding manner.

The closing process proceeds in the reverse order. The second work space 32 is deaerated via connection 33. The first work piston 18 then drops until the upper valve disk 6 is pressed into the upper valve seat 8 by the first spring 22 and second spring 29 via the tubular valve shaft 14. The lower valve disk 7 moves farther downward under pressure of the first spring 22 until the sleeve arranged on top of the valve shaft 13 abuts against the third work piston 30. The lower valve disk 7 has then reached its lower valve seat 9 and is held in this position. Therefore, when closing, a distance is again formed between the upper valve disk 6 and the lower valve disk 7, so that the leakage space 10 is again formed between the two valve disks 6, 7.

The upper and lower valve disks have throttle edges 46, 47, the diameter of the surface formed by the throttle edges 46, 47 being smaller than the diameter of the through-openings 48, 49. The diameters are selected in such a way that the surface of the annular throttle gap formed by throttle edges 46, 47 and through-openings 48, 49 is less than the surface of the bore holes leading into line 11.

To clean the lower valve seat 9, the lower valve disk can be lowered individually. In so doing, compressed air is applied to connection 40. The pressure in the third pressure space 39 increases. Since the third work piston 30 is supported on the first spring 22, the first work piston 18 with the valve shaft 13 and the lower valve disk 7 attached thereto is propelled downward by the pressure of the pretensioned spring 22 until its supporting surface 44 comes to rest on the spacer sleeve 53 and is supported with it on the upper valve disk 6 via the spring ring 31 and tubular valve shaft 14, so that it cannot move further.

Cleaning medium can penetrate from the lower housing part 5 into the leakage space 10 through the annular throttle gap formed in this position between the valve disk 7 and valve seat 9, and a cleaning of the valve seat and leakage space is carried out in this way. The medium is then discharged toward the outside via bore holes and line 11. Since the surface of the annular throttle gap is smaller than the surface of the bore holes, there is no rise in pressure in the leakage space 10 during the cleaning due to penetration of the cleaning medium.

When bore holes 11 are blocked, for example, by foreign bodies, a pressure rise takes place in the leakage space 10 due to the penetrating medium. An increased force then acts on the upper valve disk 6 in the opening direction of the valve. Since the two valve disks are mutually supported via their associated valve shafts and the spacer sleeve 53, there are no reaction forces acting in the opening direction; that is, the lower valve disk exerts an equal but oppositely directed force on the upper valve disk, so that cleaning medium is safely prevented from entering during the cleaning lift.

Since the first work piston 18 and the third work piston 30 form a rigid unit in a way when pressure is admitted to the third work space 39, the upper valve disk is pressed into its valve seat 8 by the force of the pressure spring 22. The pressing pressure of the upper valve disk 6 can be further increased in that pressure is additionally admitted to the first pressure space 24 via connection 25. In this case, compressed air is admitted to the pressure space 24 defined by the first work piston 18 and third work piston 27. The first work piston 18 is then supported, via spacer sleeve 53 and spring ring 31, on the outer valve rod 14 which presses the upper valve disk 6 into its seat.

The cleaning lift for the lower valve seat is canceled again by deaerating the pressure space 39.

The lift for cleaning the upper valve disk 6 is initiated by applying compressed air to connection 42. Due to the increased pressure in the fourth pressure space 41, the second work piston 36 is propelled upward until it contacts the spring ring 31. The tubular shaft 14 is then lifted by the spring ring 31 until that the second work piston 36 abuts against stop 38. The upper valve disk 6 is lifted slightly from its valve seat 8 in this way. Cleaning medium can now penetrate through the throttle gap between the valve seat 8 and valve disk 6 from the upper housing part 4 into the leakage space 10, so that a cleaning of the upper valve seat takes place.

In this situation as well, no cleaning medium can pass into the lower valve space when there is an increase in pressure in the leakage space 10. When there is an increase in pressure, the lower valve disk can deflect downward until the first work piston which is carried along by the valve shaft 13 abuts against the upper end face of the spacer sleeve 53. The valve disks can not move further.

For lowering, the pressure space 41 is relieved of pressure and the second work piston 36 is lowered by the second spring 29 and the valve disk 6 is pressed again into its valve seat 8 via the tubular shaft 14.

The manner of operation is summarized in the following table:

| Connection | 42 | 33 | 40 | 25 |
|---|---|---|---|---|
| Open | 0 | L | 0 | 0 |
| Close | 0 | 0 | 0 | 0 (L) |
| Clean upper seat | L | 0 | 0 | 0 |
| Clean lower seat | 0 | 0 | L | 0 (L) |

L: pressure applied
0: no pressure

Also, the valve is not sensitive to pressure shocks in the line system in the closed state. Pressure shocks in the upper valve disk only press the upper valve disk more firmly into its seat, so that no unwanted leakage can take place through it.

Pressure shocks in the lower valve part are compensated by a hydraulic compensating surface which is formed integral with the valve shaft 13 and is guided through the lower housing in the form of a balance piston 35, since the hydraulic compensating surface corresponds to that of the lower valve disk.

In this way, a valve is realized which reliably prevents the mixing of media, also during the cleaning operation, by a positive engagement of the valve disks with an advantageously reduced number of mechanical components and without additional expenditure on switching. It consumes less air for switching and therefore responds to switching commands in an advantageously fast manner.

Figure 2:
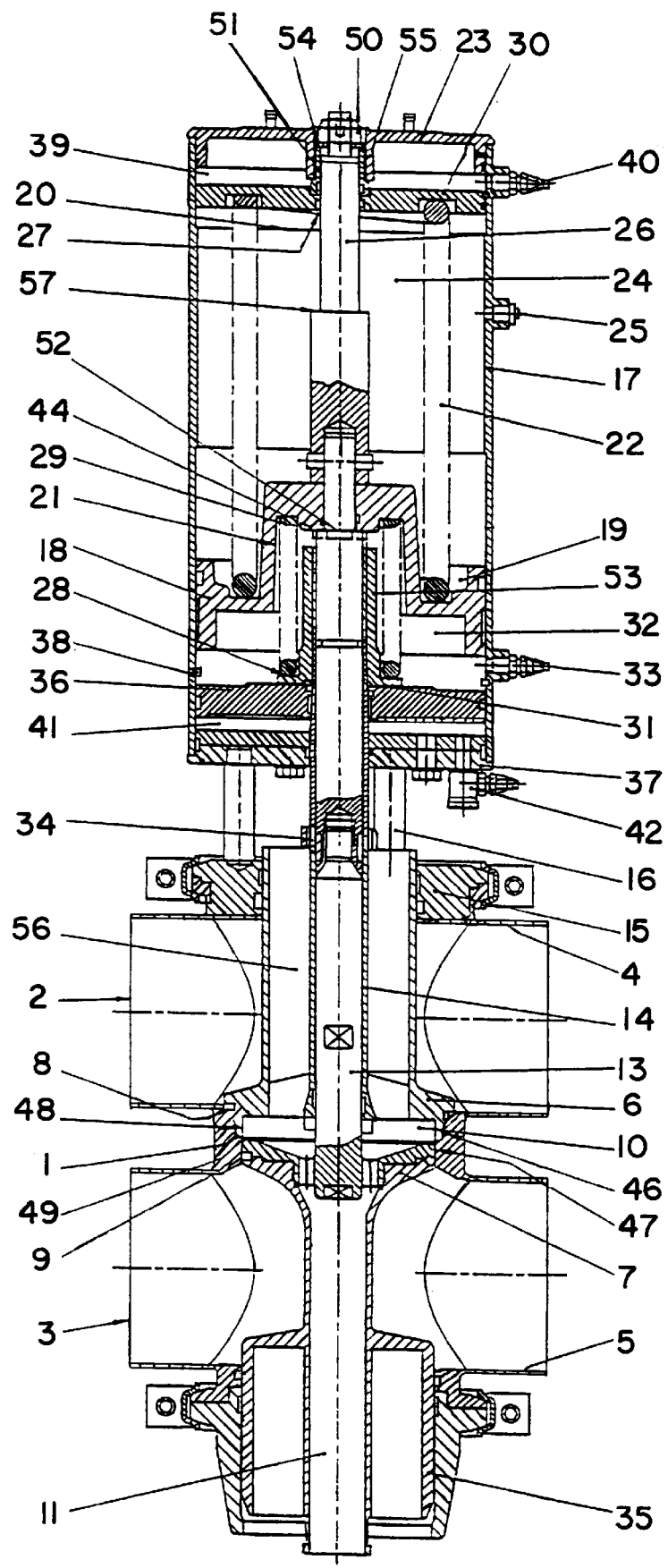
FIG. 2 shows a variant of the double seat valve according to the invention with a changed leakage outlet.

FIG. 2 shows a variant of the valve according to the description above in which the line leading out of the leakage space 10 into the open is guided upward. This line 56 can assume the diameter of the valve seat and/or can open into a housing with a fixed connection, wherein the lower line 11 can also be omitted in its entirety. When the line 56 opens into a stationary housing (not shown), the valve can also be installed in a position which is rotated by 180° relative to the view shown in the drawings.

What is claimed is:

1. Double seat valve with means for preventing leakage, particularly for the food and beverage industry, which has a housing having two valve disks (6, 7) that cooperate with one another and define a leakage space (10) which opens out into the open via lines (11), a shared drive unit being provided for the actuation of the two valve disks (6, 7), the drive unit containing a cylinder (17) with a first work piston (18) which is loaded at both sides by pressure springs (29, 22) and is fixedly connected with a valve shaft (13) of the lower valve disk (7), the valve shaft (13) penetrating the upper valve disk (6) and its tubular shaft (14) in a telescoping manner, the shaft, in turn, projecting into the cylinder (17) by its upper end and having an abutment (28) for the lower pressure spring (29) which presses the upper valve disk (6) into its seat (8), and a second work piston (36) which acts on the tubular shaft and is movable on the tubular shaft is arranged under the first work piston (18) in the cylinder (17), and a third work piston (30) which acts on the lower valve disk is arranged above the first work piston, characterized in that the first spring (22) is arranged so as to be supported at the third piston (30).

2. Double seat valve according to claim 1, characterized in that a stop (20) limiting the lift of the third piston (30) is provided in the cylinder (17).

3. Double seat valve according to claim 1, characterized in that the first spring (22) has a length defined by stops (52, 50).

4. Double seat valve according to claim 1, characterized in that the first spring (22) is arranged so as to hold the valve disks (6, 7) at a distance under pretensioning.

5. Double seat valve according to claim 1, characterized in that the spacing of the valve disks (6, 7) is adjustable.

6. Double seat valve according to claim 1, characterized in that an intermediate space is provided between the drive unit and valve housing (2), in which intermediate space an adjustable stop (34) is arranged on the tubular telescoping rod (14) for limiting the upward path of the upper valve disk.

7. Double seat valve according to claim 1, characterized in that the lower valve disk (7) is provided with a radially acting seal which cooperates with a cylindrical seat face (9) of the valve housing (1).

8. Double seat valve according to claim 1, characterized in that the upper valve disk (6) is constructed so as to cooperate with a conical seat face (8) of the valve housing (1).

9. Double seat valve according to claim 1, characterized in that the upper valve disk (6) is constructed so as to cooperate with an axial seat face of the valve housing (1).

10. Double seat valve according to claim 1, characterized in that the upper valve disk (6) has a cylindrical recess (12) for tightly receiving the lower valve disk (7).

11. Double seat valve according to claim 1, characterized in that the upper valve disk (6) has a surface which is arranged so as to form a throttle gap with a counter-face of the valve housing along a partial lift path.

12. Double seat valve according to claim 1, characterized in that the lower valve disk has a hydraulic compensating surface (35).

13. Double seat valve according to claim 1, characterized in that a leakage line (56) which is guided through the valve housing is provided concentric to the tubular shaft (14).

14. Double seat valve according to claim 13, characterized in that the concentric leakage line (56) opens into a housing.

15. Double seat valve according to claim 1, characterized in that there is provided at the cylinder (17) above the second work piston (36) a stop (38) which limits its lift.

16. Double seat valve according to claim 1, characterized in that a spacer (53) defining the minimum length of the second spring is provided between the first (18) and second work piston (36).

17. Double seat valve according to claim 1, characterized in that an adjustable stop (50, 51, 54) for the upper, third piston (30) is provided on the valve shaft (13) of the lower valve disk (7).

18. Double seat valve according to claim 1, characterized in that a stop (57) is provided for the valve shaft (13), which stop (57) limits the upward path of the valve shaft (13).

19. Double seat valve according to claim 1, characterized in that a stop (31) is provided on the tubular valve rod (14) for carrying along by the second piston (36), the second work piston (36) striking against the stop (31) at the top.

20. Double seat valve according to claim 1, characterized in that the first (18) and third piston (27) are arranged so as to form a work space (24) with a compressed air connection (25) and the first piston (18) is arranged so as to act on the upper valve disk (6).

* * * * *